(12) United States Patent  (10) Patent No.: US 9,152,312 B1
Terleski et al.  (45) Date of Patent: Oct. 6, 2015

(54) DISPLAYING RELATED CONTENT IN A CONTENT STREAM

(75) Inventors: Jonathan W. Terleski, Mountain View, CA (US); Shaun Z. Modi, San Francisco, CA (US); Cameron Knox Adams, Rozelle (AU)

(73) Assignee: GOOGLE INC., Mountain View, CA (US)

( * ) Notice: Subject to any disclaimer, the term of this patent is extended or adjusted under 35 U.S.C. 154(b) by 269 days.

(21) Appl. No.: 13/359,431

(22) Filed: Jan. 26, 2012

Related U.S. Application Data

(60) Provisional application No. 61/436,567, filed on Jan. 26, 2011.

(51) Int. Cl.
*G06F 3/048* (2013.01)
*G06F 17/20* (2006.01)
*G06F 3/00* (2006.01)
*G06F 3/0485* (2013.01)
*G06F 3/0488* (2013.01)
*G06Q 50/00* (2012.01)

(52) U.S. Cl.
CPC ............ *G06F 3/0485* (2013.01); *G06F 3/0488* (2013.01); *G06Q 50/01* (2013.01)

(58) Field of Classification Search
CPC ...... G06F 3/0485; G06F 3/0488; G06Q 50/01
USPC .......................................... 715/784, 719, 273
See application file for complete search history.

(56) References Cited

U.S. PATENT DOCUMENTS

| 5,905,863 A | * | 5/1999 | Knowles et al. | 709/206 |
|---|---|---|---|---|
| 7,669,123 B2 | * | 2/2010 | Zuckerberg et al. | 715/273 |
| 7,945,653 B2 | * | 5/2011 | Zuckerberg et al. | 709/223 |
| 2007/0027857 A1 | * | 2/2007 | Deng et al. | 707/3 |
| 2010/0302059 A1 | * | 12/2010 | Hnatiuk et al. | 340/825.72 |
| 2011/0083101 A1 | * | 4/2011 | Sharon et al. | 715/800 |
| 2012/0124475 A1 | * | 5/2012 | Foote et al. | 715/719 |

* cited by examiner

*Primary Examiner* — Jennifer To
*Assistant Examiner* — Li Sun
(74) *Attorney, Agent, or Firm* — Morgan, Lewis & Bockius LLP

(57) ABSTRACT

A method includes displaying a scrollable sequence of content items, the content items having a plurality of sources and a plurality of content types; in response to user commands, scrolling the scrollable sequence of content items in a direction parallel to a first axis; visually indicating a first focus item in the scrollable sequence and displaying in the current focus item an affordance including a related-content affordance; and responding to user selection of the related-content affordance in the current focus item by scrolling the current focus item in a direction parallel to a second axis that is distinct from the first axis and displaying a second focus item in place of the first focus item, the second focus item including a content item of one or more content items related to the first focus item in accordance with predefined criteria.

27 Claims, 14 Drawing Sheets

John Smith's Page

Profile
Circles
...

Content Item Sequence 408

Best - Latest

...

Booooo!

Giants' Juan Uribe reaches deal with Dodgers – SFGate.com — 412

Boo-ree-bay? One of the most adored Giants is heading to the Dodgers, who are reshuffling their roster in an aggressive attempt to elevate from fourth place and unseat their rivals ... — 414

13:15  436-1
  436-2

Giants offered to ...
Busy Dodgers ...
Uribe Chases ...

🔒 Public

Endorse  Comment  Share 432
434
410-1

Photos from my trip to China!

China trip 2010 – Photo Album (50 photos)

| Thumb-nail 1 | Thumb-nail 2 | Thumb-nail 3 |

See related

DISPLAYING RELATED CONTENT IN A CONTENT STREAM

RELATED APPLICATIONS

This application claims priority to U.S. Provisional Patent Application No. 61/436,567, filed Jan. 26, 2011, which is hereby incorporated by reference herein in their entirety.

BACKGROUND

The disclosed embodiments relate generally to social networking. More particularly, the disclosed embodiments relate to displaying related content within a content stream.

Computers and mobile devices, such as mobile phones, have become increasingly interconnected due to the widespread availability of wired and wireless connections to communications networks such as the Internet. This interconnectivity has enabled ways for people to communicate with people far and near and to maintain social and professional bonds.

A popular means of communication that takes advantage of the interconnectivity are web-based social network applications. In such social network applications, a user can post a variety of comments, from short messages or comments about his status or activities or just about anything, to photos and videos and articles of interest. Users can find other users that they know or with whom they share interests and become followers of each others' postings. As such, social network applications offer their users opportunities to communicate and connect with each other through their social bonds and/or common interests.

SUMMARY

In accordance with some embodiments, a method is performed by a system having one or more processors, a display, and memory storing one or more programs for execution by the one or more processors. The method includes displaying a scrollable sequence of content items, the content items having a plurality of sources and a plurality of content types; in response to user commands, scrolling the scrollable sequence of content items in a direction parallel to a first axis; visually indicating a first focus item in the scrollable sequence and displaying in the current focus item an affordance including a related-content affordance; and responding to user selection of the related-content affordance in the current focus item by scrolling the current focus item in a direction parallel to a second axis that is distinct from the first axis and displaying a second focus item in place of the first focus item, the second focus item including a content item of one or more content items related to the first focus item in accordance with predefined criteria.

These and other embodiments can include one or more of the following features. The predefined criteria may include a criterion that a source of the second focus item be the same as a source of the first focus item. The predefined criteria may include a criterion that a content type of the second focus item be the same as a content type of the first focus item. The predefined criteria may include a criterion that the second focus item is determined to be similar to the first focus item in accordance with predefined similarity criteria. The predefined criteria may include a criterion with respect to similarity scores that correspond to similarity of the first focus item to respective content items that include the second focus item.

The predefined criteria may include distinct criteria for each of a plurality of content types, such as, for a first content type, a criterion that a source of the second focus item be the same as a source of the first focus item, and for a second content type, a criterion that the second focus item is determined to be similar to the first focus item in accordance with predefined similarity criteria.

The method may include concurrently displaying, along with the second focus item, a list of one or more of the respective content items. The method may include concurrently displaying, along with the second focus item, a list of additional content items related to the first focus item. The method may include providing an affordance enabling the user to share the second focus item with one or more social groups specified by the user. The method may include providing an affordance enabling the user to attach a comment to the first focus item. The method may include providing an affordance enabling the user to attach a comment to the second focus item. The method may include displaying, concurrently with displaying the first focus item, information indicating a visibility status of the first focus item.

The method may include concurrently displaying the first focus item and at least one neighboring item in the scrollable sequence of content items. Optionally, the first focus item and the at least one neighboring item are concurrently displayed in an ordering within the scrollable sequence of content items, and the method may further include concurrently displaying the second focus item and the at least one neighboring item in the scrollable sequence of content items, wherein the second focus item is displayed at the same position with respect to the at least one neighboring item within the scrollable sequence of content items as the first focus item is displayed with respect to the at least one neighboring item.

In accordance with some embodiments, a system includes, one or more processors, memory, and one or more programs; the one or more programs are stored in the memory and configured to be executed by the one or more processors and the one or more programs include instructions for performing the operations of the method described above. In accordance with some embodiments, a non-transitory computer readable storage medium has stored therein one or more programs including instructions which, when executed by a system, cause the system to perform the operations of the method described above. These and other embodiments may include one or more of the additional features listed above.

BRIEF DESCRIPTION OF THE DRAWINGS

FIGS. 4A-4I illustrate an social network page with a content item sequence, in accordance with some embodiments.

Like reference numerals refer to corresponding parts throughout the drawings.

DETAILED DESCRIPTION

Reference will now be made in detail to embodiments, examples of which are illustrated in the accompanying drawings. In the following detailed description, numerous specific details are set forth. However, it will be apparent to one of ordinary skill in the art that various embodiments may be practiced without many of these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact. The first contact and the second contact are both contacts, but they are not the same contact.

The terminology used in the description herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Figure 1:
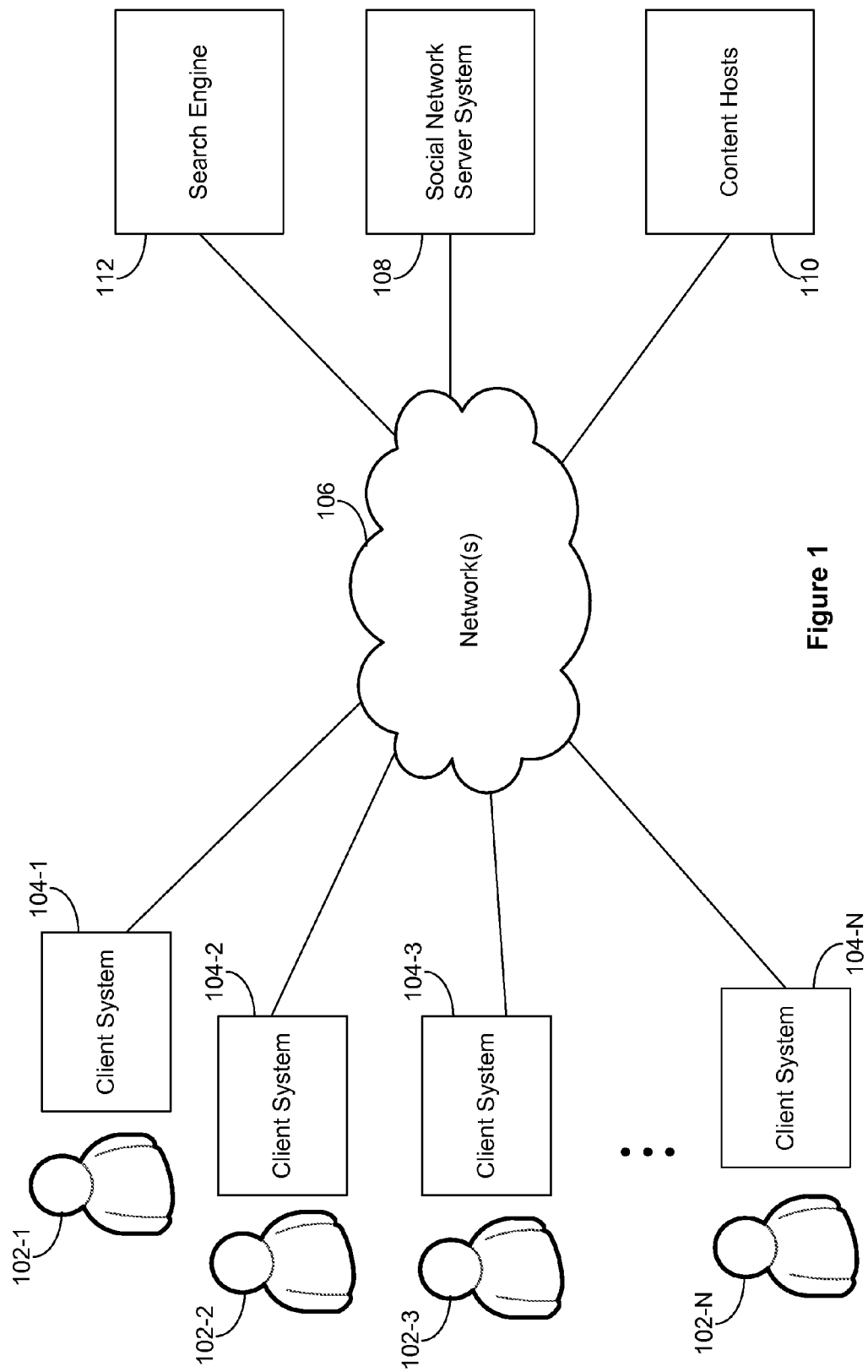
FIG. 1 is a block diagram of a network architecture of a social network in accordance with some embodiments.

FIG. 1 is a block diagram of a network architecture 100 of a social network in accordance with some embodiments. The network architecture 100 includes a number of client systems (also called "client devices," "client computers," or "clients") 104-1, 104-2 . . . 104-N communicably connected to a social network server system 108 by one or more networks 106.

In some embodiments, the client devices 104-1, 104-2 . . . 104-N can be computing devices such as laptop or desktop computers, smart phones, personal digital assistants, portable media players, tablet computers, or other appropriate computing devices that can be used to communicate with an electronic social network. In some embodiments, the social network server system 108 can be a single computing device such as a computer server, while in other embodiments, server system 108 is implemented by multiple computing devices working together to perform the actions of a server system (e.g., cloud computing). In some implementations, the network(s) 106 can be a public communication network (e.g., the Internet, cellular data network, dialup modems over a telephone network) or a private communications network (e.g., private LAN, leased lines) or a combination of such communication networks.

Users 102-1 through 102-N of the client devices 104-1 through 104-N access the social network server system 108 to participate in a social networking service. For example, one or more of the client devices 104-1, 104-2 . . . 104-N execute web browser applications that can be used to access the social networking service. In another example, one or more of the client devices 104-1, 104-2 . . . 104-N execute software applications that are specific to the social network (e.g., social networking "apps" running on smart phones).

Users interacting with the client devices 104-1, 104-2 . . . 104-N can participate in the social networking service provided by the server system 108 by posting information, such as text comments (e.g., updates, announcements, replies, notes, tweets), digital photos, videos, or other appropriate electronic information. Users of the social networking service can also annotate information posted by other users of the social networking service (e.g., endorsing or "liking" a posting, commenting on a posting). In some embodiments, information can be posted on a user's behalf by systems and/or services external to the social network or the server system 108. For example, the user may post a review of a movie to a movie review website, and with proper permissions that website may cross-post the review to the social network on the user's behalf. In another example, a software application executing on a mobile device, with proper permissions, may use global positioning system (GPS) capabilities to determine the user's location and automatically update the social network with his location (e.g., "At Home", "At Work", "In Brownsdale, Minn.").

The information posted by users 102 to the social networking service may include content posted directly into the social network service (e.g., text comment entered into a text entry field in the social networking service, photos uploaded from a client system 104 to the social network server system 108). The posted information may also include links to content external to the social networking service or external content that is embedded into the posted information. In some embodiments, the external content is located at content hosts 110. For example, the external content may be web pages (including, for example, news articles) hosted outside of the social network service or videos hosted at a video sharing site external to the social networking service. In some embodiments, the social network server system 108 may retrieve all or parts of the external content from a content host 108 in order to generate information (e.g., article snippet and other information, sample frame of video, video information) to help users viewing the posts identify the external content.

In some embodiments, the social network server system 108 identifies content related to the content posted by users. The related content may be content that is related based on subject matter or on source, for example. The social network server system 108 may communicate with search engine 112 to find content related to an external content item posted by a user. In some embodiments, the social network service may determine a similarity score between a posted content item and another content item to ascertain whether the two content items are related.

Users interacting with the client devices 104-1, 104-2 . . . 104-N can also use the social network provided by the server system 108 to define social circles, in order to organize and categorize the user's relationships to other users of the social network and to regulate which users in the social network will have access to information posted by the user.

Figure 2:
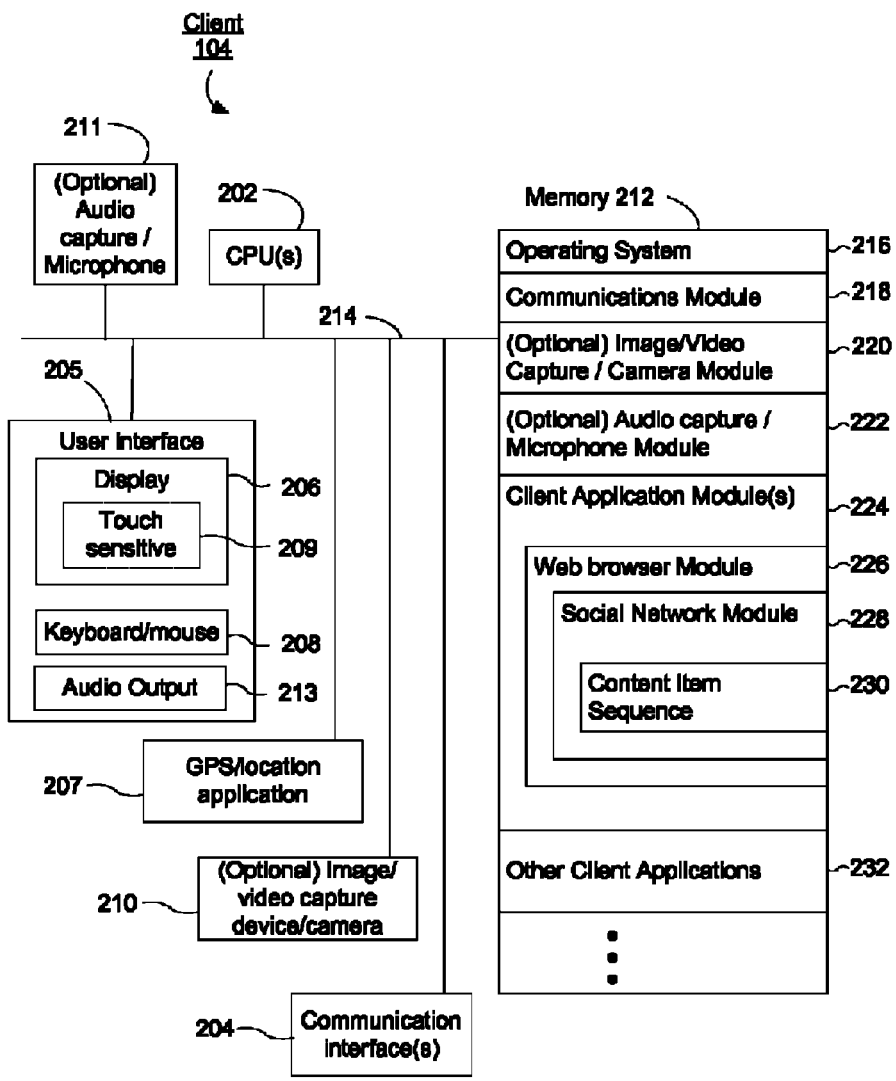
FIG. 2 is a block diagram illustrating a client system in accordance with some embodiments.

FIG. 2 is a block diagram illustrating a client system 104 in accordance with some embodiments. Client system 104 typically includes one or more processing units (processors, sometimes called microprocessors, CPUs or CPU processors) 202, one or more network or other communications interfaces 204, memory 212, and one or more communication buses 214 for interconnecting these components. The communication buses 214 optionally include circuitry (sometimes called a chipset) that interconnects and controls communications between system components. Client system 104 includes a user interface 205. The user interface 205 typically includes a display device 206 and optionally includes an input means such as a keyboard, mouse, or other input buttons 208. Alternatively or in addition the display device 206 includes a touch sensitive surface 209, in which case the display 206/209 is a touch sensitive display. In client systems that have a touch sensitive display 206/209, a physical keyboard is optional (e.g., a soft keyboard may be displayed when keyboard entry is needed). Optionally, the user interface includes an audio output device 213, such as speakers or an audio output connection connected to speakers, earphones, or headphones. Furthermore, some client systems use a microphone and voice recognition to supplement or replace the keyboard. Optionally, the client 104 includes an audio capture device 211 (e.g., a microphone) to capture audio (e.g., speech from a user). Optionally, the client 104 includes a GPS (global positioning satellite) receiver, or other location detection apparatus 207 for determining the location of client system 104. Client system 104 also optionally includes an image/video capture device 210 such as a camera or webcam.

Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the processor(s) 202. Memory 212, or alternately the non-volatile memory device(s) within memory 212, comprises a non-transitory computer readable storage medium. In some embodiments, memory 212 or the computer readable storage medium of memory 212 stores the following programs, modules and data structures, or a subset thereof:
- an operating system 216 that includes procedures for handling various basic system services and for performing hardware dependent tasks;
- a network communication module 218 that is used for connecting client system 104 to other computers via the one or more communication network interfaces 204 (wired or wireless) and one or more communication networks, such as the Internet, other wide area networks, local area networks, metropolitan area networks, and so on;
- optionally, a image/video capture module or camera module 220 for processing a respective image or video captured by the image/video capture device/camera 210, where the respective image or video may be sent or streamed (e.g., by a client application module) to the social network server system;
- optionally, an audio capture module or microphone module 222 for processing audio captured by the audio capture device/microphone 211, where the respective audio may be sent or streamed (e.g., by a client application module) to the social network server system;
- one or more client application modules 224, typically including a web browser module 226 for executing and rendering a social network module 228 which provides an interface to a social network (e.g., a social network provided by social network server system 108) and related features; alternatively, or in addition, client application modules 224 include a client application (not shown) specifically for accessing one or more social networks, such as the social network provided by server system 108;
- a content item sequence 230, which displays a sequence of content items posted by one or more users of the social network; and
- additional optional client applications 232 such as a digital media playback and organization application.

Figure 3A:
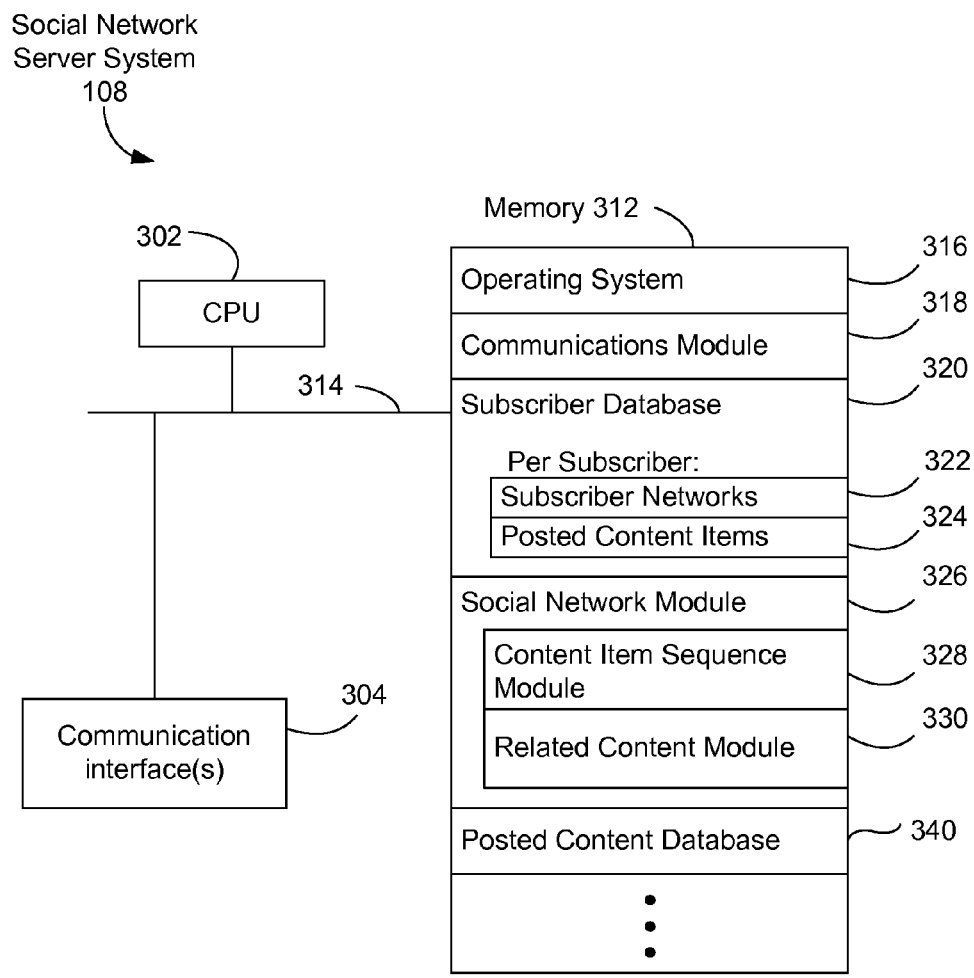
FIG. 3A is a block diagram illustrating a social network server system in accordance with some embodiments.

FIG. 3A is a block diagram illustrating a social network server system 108 in accordance with some embodiments. The social network server system 108 typically includes one or more processing units (processors, sometimes called microprocessors, CPUs or CPU processors) 302, one or more network or other communications interfaces 304, memory 312, and one or more communication buses 314 for interconnecting these components. The communication buses 314 optionally include circuitry (sometimes called a chipset) that interconnects and controls communications between system components. The social network server system 108 optionally includes a user interface (not shown). The user interface, if provided, may include a display device and optionally includes an input means such as a keyboard, mouse, or other input buttons. Alternatively or in addition the display device includes a touch sensitive surface, in which case the display is a touch sensitive display.

Memory 312 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 312 may optionally include one or more storage devices remotely located from the processor(s) 302. Memory 312, or alternately the non-volatile memory device(s) within memory 312, comprises a non-transitory computer readable storage medium. In some embodiments, memory 312 or the computer readable storage medium of memory 312 stores the following programs, modules and data structures, or a subset thereof:
- an operating system 316 that includes procedures for handling various basic system services and for performing hardware dependent tasks;
- a network communication module 318 that is used for connecting the social network server system 108 to other computers via the one or more communication network interfaces 304 (wired or wireless) and one or more communication networks, such as the Internet, other wide area networks, local area networks, metropolitan area networks, and so on;
- a subscriber database 320 for storing data associated with subscribers/members of the social network, including login information, privacy and other preferences, biographical data, and so forth;
- subscriber network information 322 in subscriber database 320 for storing data regarding groups and circles of subscribers in the social network and connections between subscribers;
- posted content items 324, retained for each subscriber (or for each subscriber); the posted content items include content items, whether they be content uploaded to and stored at the social network server system 108 or links to external content, posted by the subscriber;
- a social network module 326 for providing social network services and related features, in conjunction with social network module 328 on client system 104;
- content item module 328 for ordering posted content items into a sequence, sending the sequence to a client system 104 for display, and for sending related content items to the client system 104 for display; and
- related content module 330 for identifying content related to a posted content item 324.

Figure 3B:
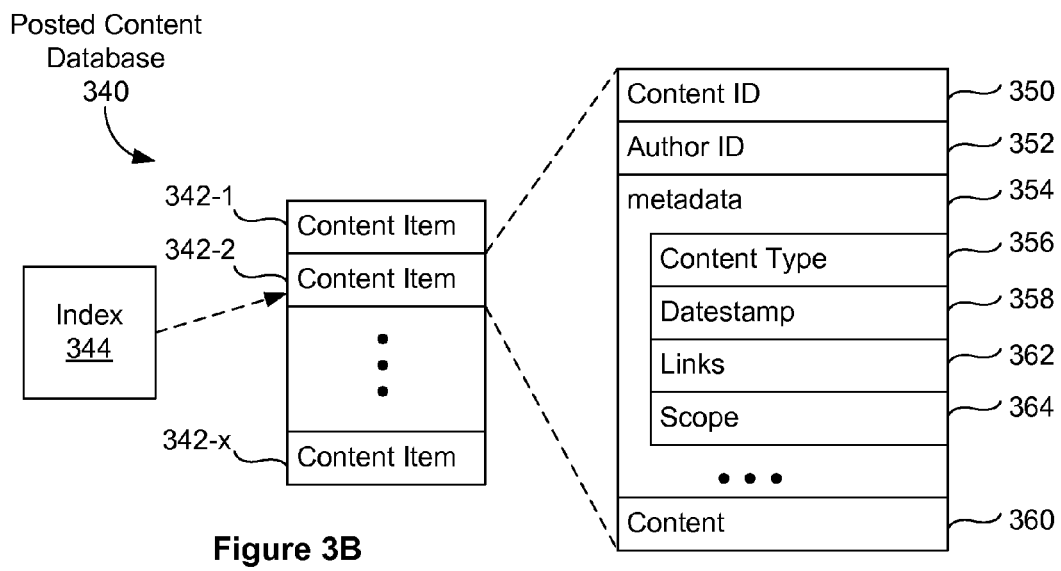
FIG. 3B is a block diagram of a posted content database.

The social network server system 108 typically includes a database 340 for storing and accessing posted content. As shown in FIG. 3B, posted content database 340 includes content items 342, also called posts, and an index 344 for helping to locate items in the database. A respective content item 342 includes a content identifier (content ID) 350, which uniquely identifies the content item, an author identifier (author ID) 352 of the person who posted the content item, metadata 354 representing various characteristics of the content item, and the content 360 of the content item 342. In some embodiments, metadata 354 includes a content type identifier 356, identifying the type of the post (e.g., text, photo, URL, etc.), and a datestamp 358 that identifies when the content item was posted, links 362 to related content items (e.g., a link to an item commented on by this post, links to other content items that comment on this post). In some embodiments, metadata 354 also includes a distribution scope 364. The distribution scope 364 specifies the range of users allowed to access the content item. Examples of the scope 364 are "public," indicating that all users of the social network can access the item, a list of one or more social network circles (i.e., users in those circles are allowed to access the content item), one or more user identifiers, other social groups (defined in any appropriate manner), or any suitable combination of social network circles and user identifiers and optionally other social groups. In some embodiments, the data structures used to store content items 342 are more complex than shown in FIG. 3B.

Social network module 326 utilizes posted content database 340 both to determine what items to include in a (primary) content item sequence 408 (FIG. 4A) of the subscriber, and also to identify related content items to display when the subscriber activates an affordance to request that one or more related content items be displayed, as described in more detail below.

Figure 4A:
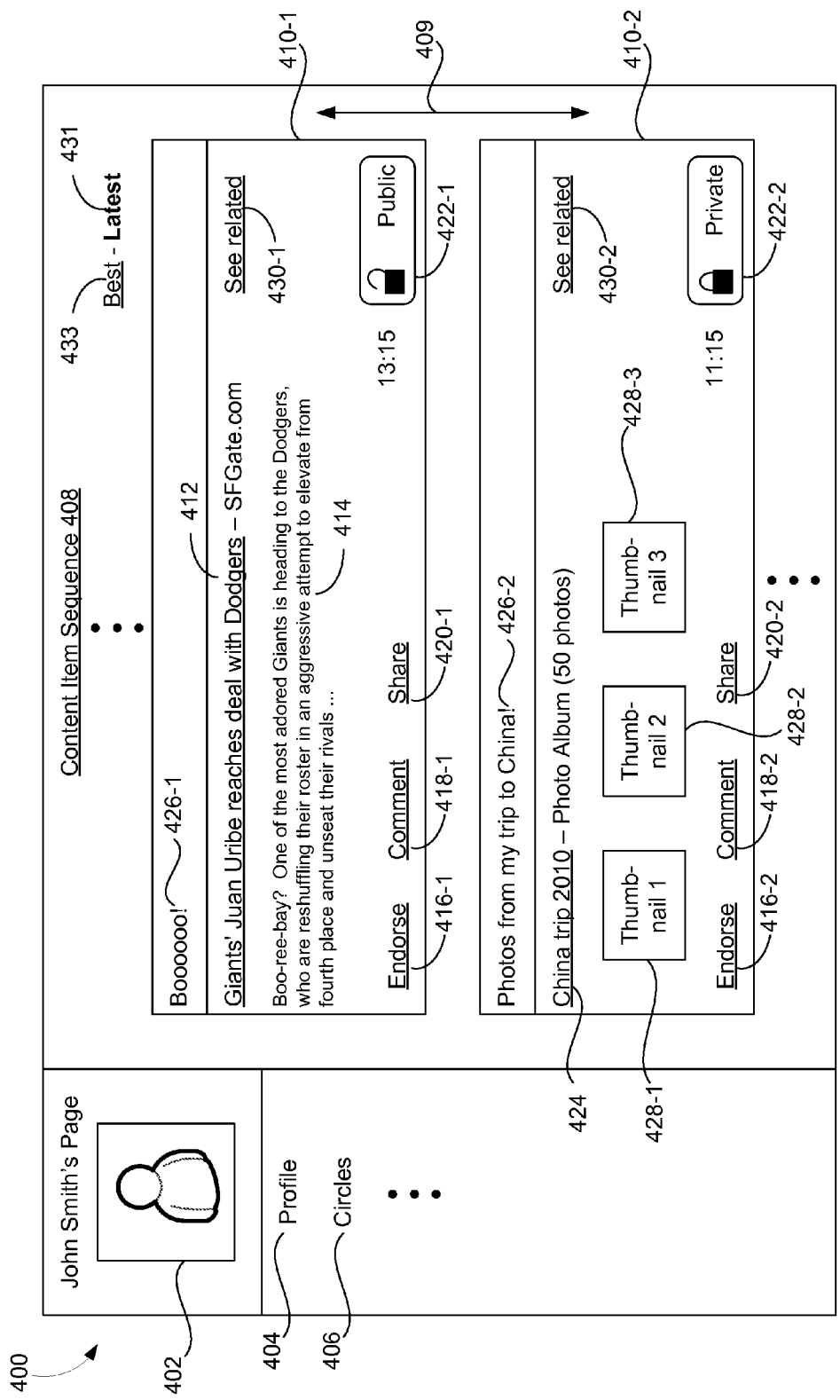

FIGS. 4A-4I illustrate an social network page 400 in accordance with some embodiments. FIG. 4A depicts a social network page 400 that is associated with a subscriber/member (e.g., "John Smith") of a social network service provided by social network server system 108. The social network page 400 includes content or links to information associated with the subscriber, such as a photo 402 of the subscriber, a link 404 to a profile of the subscriber, and one or more links 406 to information on circles of subscribers to which the subscriber belongs or categories or groups of contacts in the subscriber's network within the social network. In some embodiments, the social network page 400 also includes a link to a roster of contacts (which may include subscribers and/or non-subscribers to the social network) within the subscriber's network of contacts.

The social network page 400 also includes a content item sequence (also called a content (item) feed, content (item) stream, or content sequence) 408. The content item sequence 408 includes one or more updates, links, and other content item posts 410 authored by the subscriber (John Smith) associated with the social network page 400. In some embodiments, the content feed 408 may include content (e.g., links, videos, photos, status updates, etc.) posted by other contacts in the subscriber's circles and network and/or by third parties (e.g., a feed associated with an external web site) to which the subscriber has given permission to post content to the content feed 408. The user may scroll up or down (e.g., by issuing commands using a keyboard/mouse 208), along axis 409, through the content item sequence 408 to view the posts 410 in the content item sequence 408.

The content items in the posts 410 may include "external" content items (e.g., a post 410-1 of a link to an external news article, or more generally, a link to an external web page at a content host 110) and "internal" content items (e.g., a post 410-2 of a photo album containing photos uploaded to the social network server system 108). The post 410-1 to an external news article includes a link 412 to the article at a content host 110 and a preview 414 (e.g., a snippet) of the article; a user viewing the content item sequence 408 may select the link 412 to view the article. The post 410-1 also includes links 416-1, 418-1, and 420-1 for endorsing the post 410-1, commenting on the post 410-1, and sharing the post 410-1 with others in the social network, respectively. These links are sometimes herein called affordances, as these links are for accessing features of the social networking system, as opposed to accessing web pages at particular URLs. A user viewing the social network page 400 and the post 410-1 may select the link 416-1 to endorse or "like" the post 410-1. The viewing user may select the link 418-1 to add a comment to the post 410-1. The viewing user may select the link 410-1 to share the content item in the post 410-1 with others in the social network (e.g., with one or more individuals and/or groups (e.g., circles) in the social network). In some embodiments, the post 410-1 also includes a comment 426-1 by the author of the post. In some embodiments, the post 410-1 also includes an indicator 422-1 of the visibility status of the post 410-1 (e.g., whether the post 410-1 is visible to (i.e., shared with) everyone or to a limited set of subscribers in the social network).

The post 410-2 to a photo album of photos uploaded to the social network server system 108 includes a link 424 to the album and thumbnails 428 of one or more photos in the album. The post 410-2 also includes links 416-2, 418-2, and 420-2 for endorsing the post 410-2, commenting on the post 410-2, and sharing the post 410-2, respectively. In some embodiments, the post 410-2 also includes a comment 426-2 by the author of the post. In some embodiments, the post 410-2 also includes an indicator 422-2 of the visibility status of the post 410-2 (e.g., whether the post 410-2 is shared with everyone or with a limited set of users). The user may select the link 424 to view the corresponding photo album or select a thumbnail 428 to view the photo corresponding to the selected thumbnail.

The posts 410-1 and 410-2 each include a respective link 430 (also called a related-content affordance) to display related content. When the link 430 is selected by the user, content related to the post may be displayed. For example, if the user selects the "see related" link 430-1, content related to the article linked by the link in the post 410-1 may be displayed. Further details regarding displaying content related to a posting are described below.

A "latest" selector 431, when selected, causes the posts in the content item sequence 408 (including posts 410-1 thru 410-2) to be arranged chronologically (e.g., arranged by length of time since they were posted). A "best" selector 433, when selected, causes the content item sequence 408 (including posts 410-1 thru 410-2) to be arranged by quality (e.g., estimated relevance to the user). In some embodiments, the quality of posts may be determined by the viewing user's relationship to the author of the post, the reputation of the author, the number of other people who read, endorsed, commented on, or shared the post, how well the subject matter of the post aligns with the viewing user's preferences or interests, or other appropriate criteria that can be used to estimate a post's relevance to the viewing user. In some embodiments, a stream arranged according to the estimated relevancies of the posts it includes can be called a "perfect stream."

A post input area (not shown) may also be displayed in or near (e.g., at the top of) the content item sequence 408. A user can click on the post input area, indicating intent to post something to the social network.

Figure 4B:
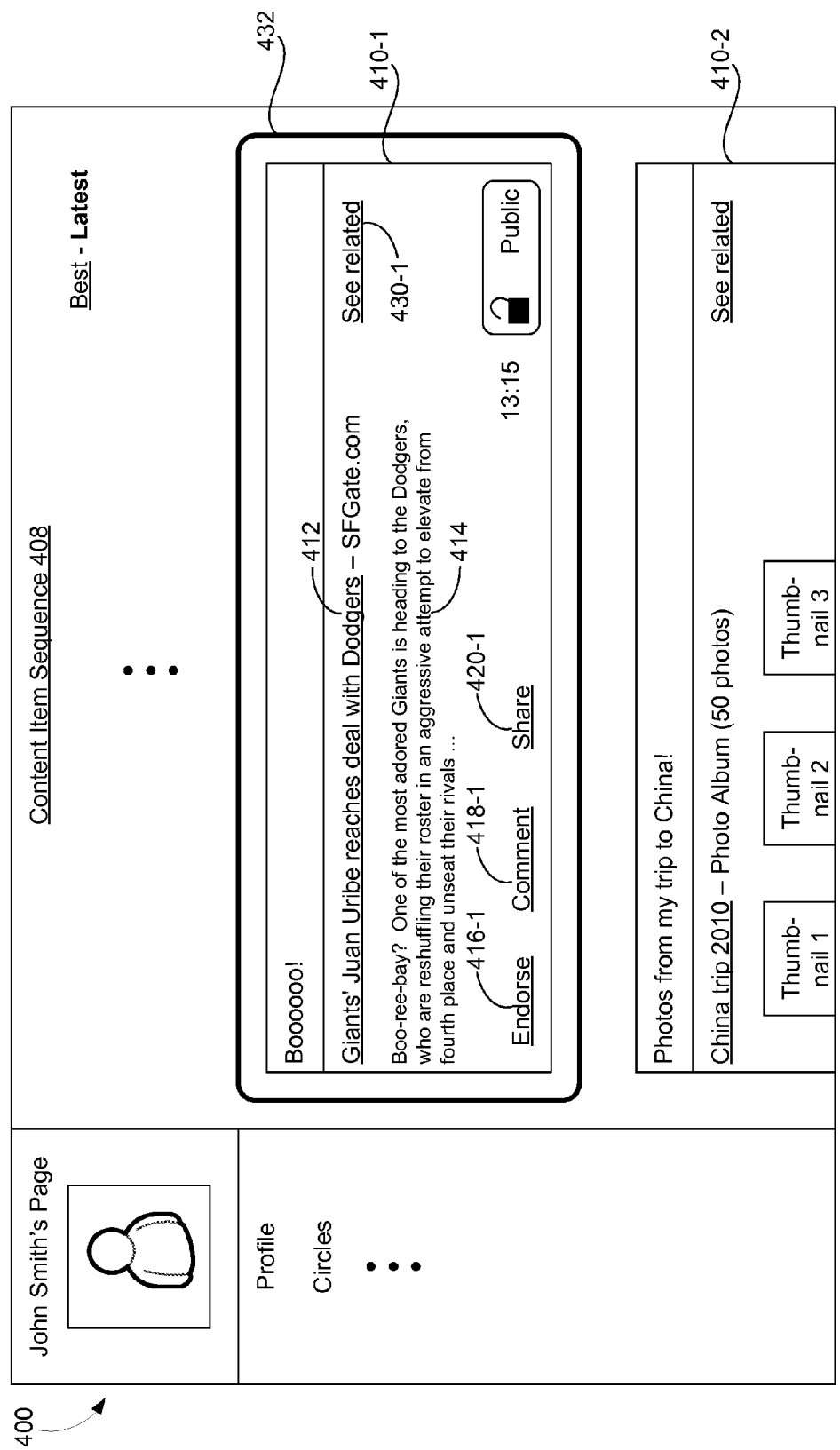

FIG. 4B illustrates a post 410-1 in focus within the content item sequence 408. In some embodiments, the user viewing the content item sequence 408 may put a post in focus within the content item sequence 408 by clicking on an empty space within the post. A focus box 432 is displayed surrounding the post 410-1 to indicate that post 410-1 is in focus. While the post 410-1 is in focus, the user may select the "see related" link 430-1. In some embodiments, the post 410-1 is put into focus when the user clicks on the "see related" link 430-1, without having to click on an empty space in the post 410-1 prior to clicking on link 430-1.

While the post 410-1 is in focus, other content item posts 410 above and below the in-focus post may be displayed concurrently and in the same positions in the contact item sequence 408 with respect to the post 410-1 as when the post 410-1 is out of focus. For example, the post 410-2, which is immediately below the post 410-1 in the content item sequence 408, is concurrently displayed below the post 410-1 while the post 410-1 is in focus.

FIG. 4C illustrates a listing 434 of content related to the article linked to in the post 410-1. In response to the user selecting the "see related" link 430-1, a related content listing 434 is displayed in place of the "see related" link 430-1. The related content listing 434 shows titles or other identifiers of articles related to the article linked to by the link 412. Arrows 436 are also displayed in the post 410-1. A user may select one arrow 436-1 to scroll the listing 434 of related content in one direction and select the arrow 436-2 to scroll the listing 434 of related content in the opposite direction.

Figure 4D:
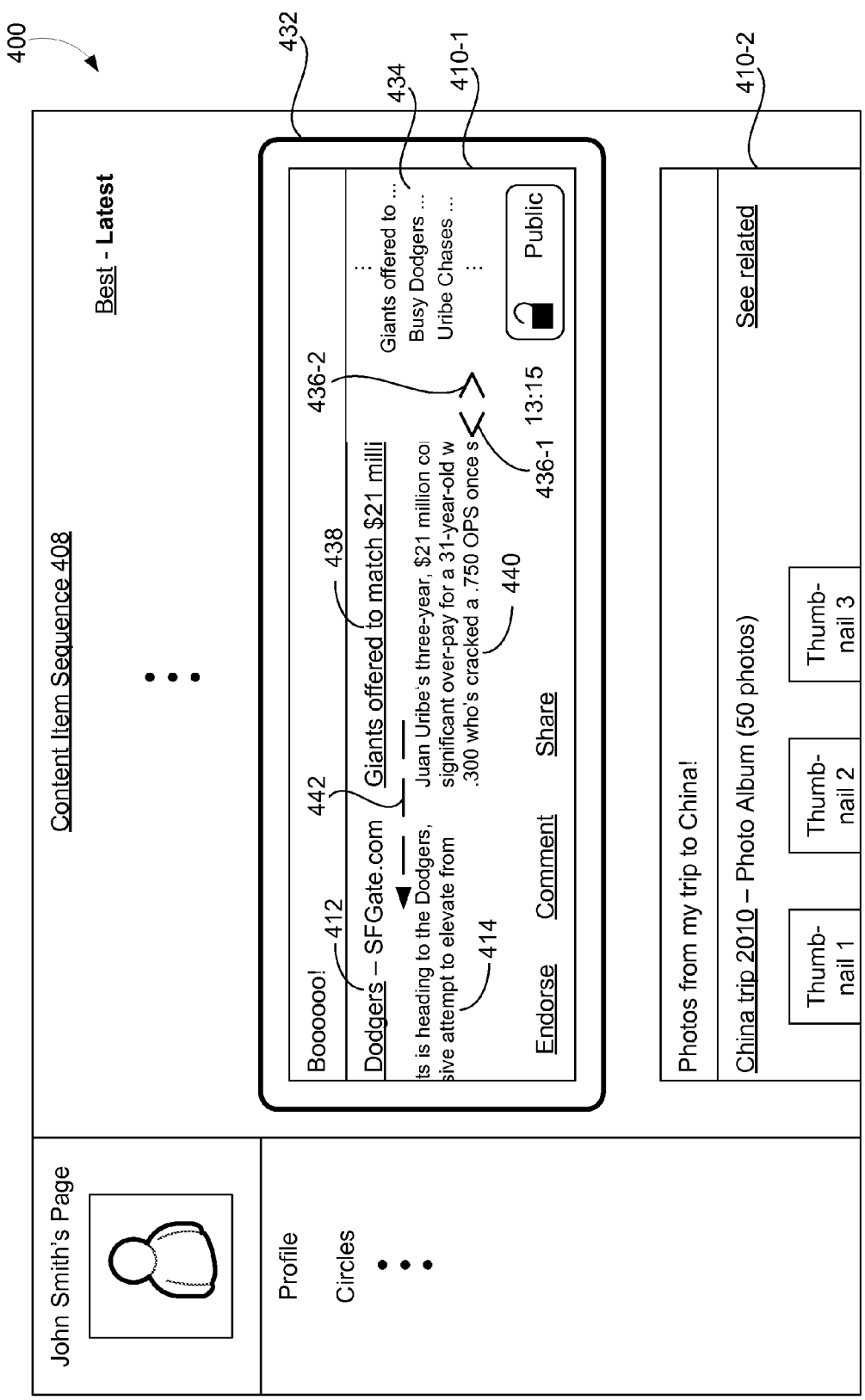
Figure 4E:
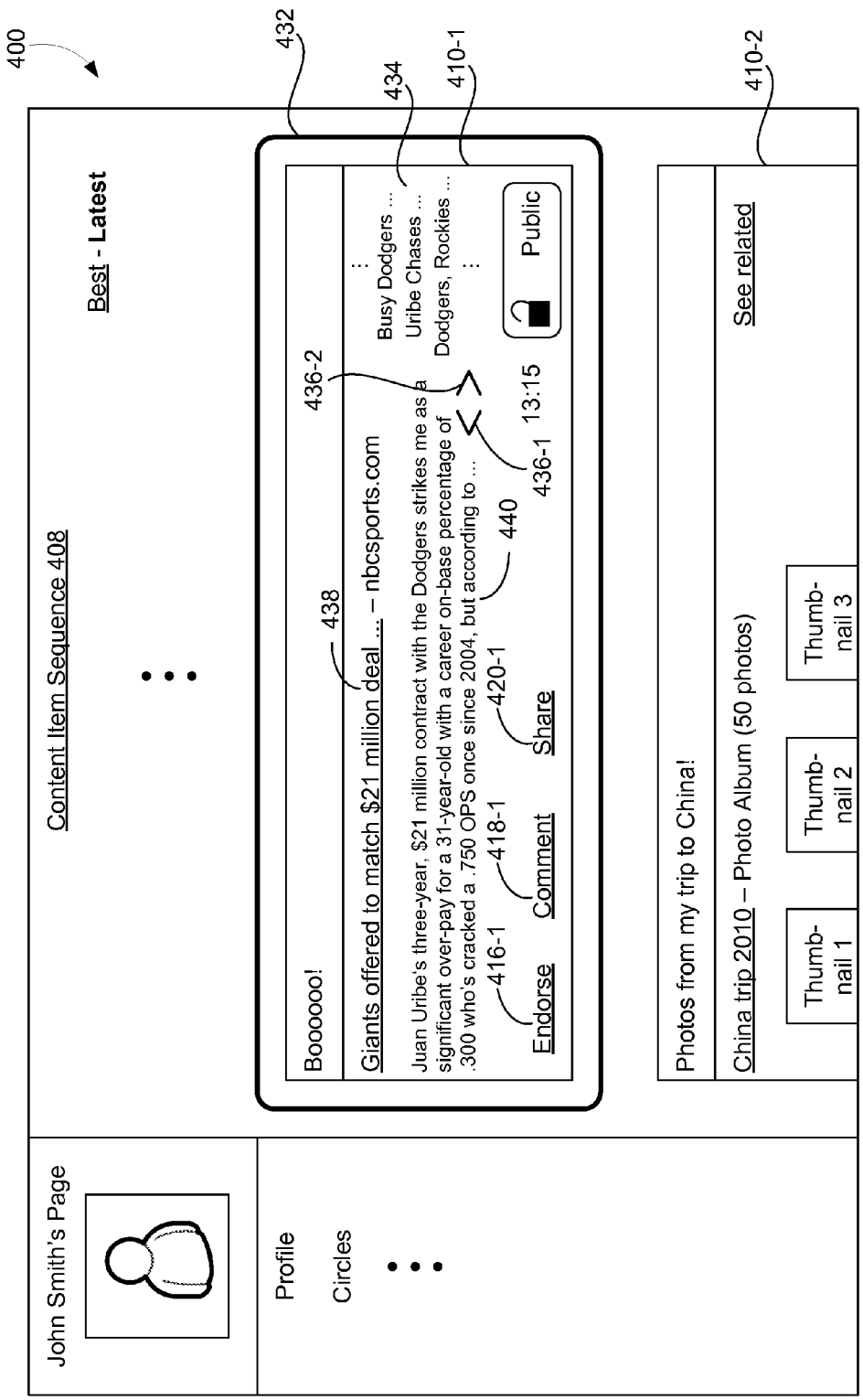

When the user selects an arrow 436 to scroll through the list 434 of related content, the link 412 and the preview 414 for the posted article is replaced by a link and a preview (e.g., a snippet) for a related article in the related content listing 434. FIG. 4D shows a snapshot of a transition, within the posting 410-1, from display of the link 412 and preview 414 to display of the link 438 and preview 440 for a related article. The posted article link 412 and preview 414 move out of view in direction 442, which is perpendicular to the axis 409, and the related article link 438 and preview 440 move into view, also in direction 442. When the transition is complete, the related article link 438 and a preview 440 of the related article is displayed within the post 410-1, as shown in FIG. 4E. The user may select the link 438 to view the related article at the content host 110. The related content list 434 also scrolls to show the title or identifier of another related content item.

It is noted that direction 442 is parallel to a second axis that is distinct from the axis 409. In some embodiments, axis 409 is a vertical axis and direction 442 is parallel to a horizontal axis. In some other embodiments, content item sequence 408 scrolls horizontally, and related content items are viewed by vertical scrolling.

While the related content link 438 and preview 440 are displayed in the post 410-1, the endorse link 416-1, comment link 418-1, and the share link 420-1 remain displayed. The user may select these links to endorse the related content item linked by the link 438, comment on the related content item, or share the related content item, respectively.

As described above with respect to FIG. 4B, other posts in the content item sequence 408 may be concurrently displayed at the same position with respect to an in-focus post (e.g., post 410-1, FIG. 4B) as when the in-focus post was out of focus. When related content is displayed in a content item post, as is the case with the post 410-1 in FIG. 4E, the posts above and below the post 410-1 in the content item sequence 408 are concurrently displayed in the same position with respect to the post 410-1 as when the post 410-1 is out of focus and displaying the originally posted content item. For example, in FIG. 4E, the post 410-2 is concurrently displayed below the post 410-1 in the content item sequence 408 while related content is displayed in the post 410-1.

Figure 4F:
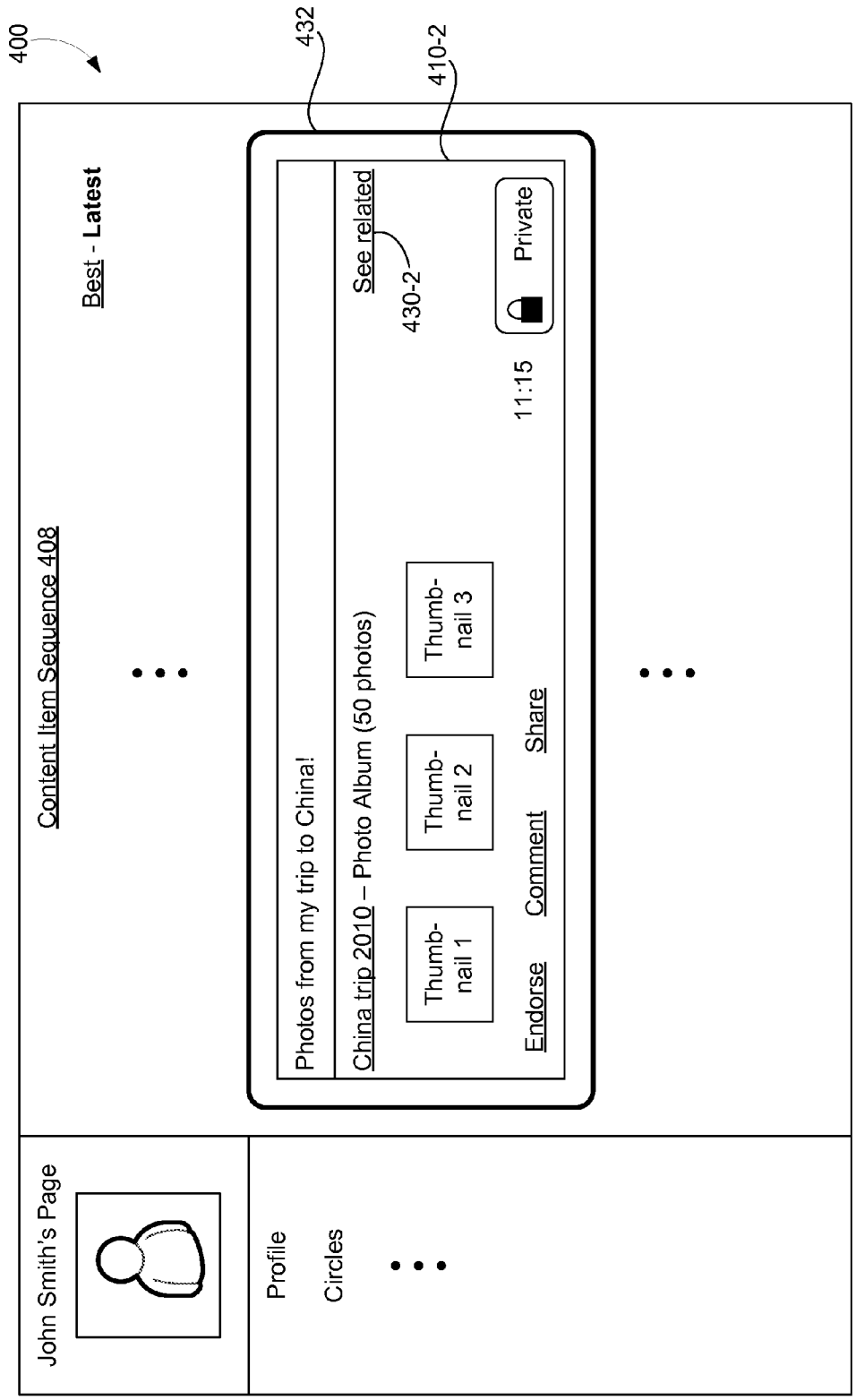
Figure 4G:
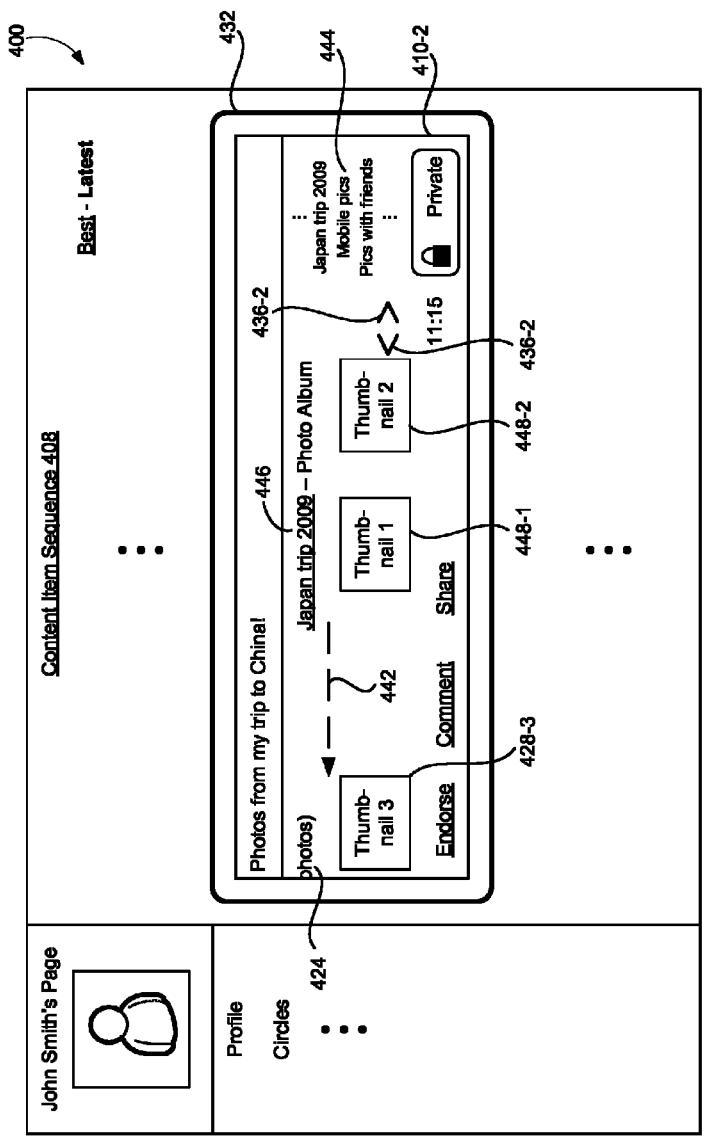

The post 410-1 may be taken out of focus by the user selecting an empty space in the content item sequence 408, outside of the post 410-1, or putting another post in the content item sequence 408 into focus. For example, the user may select the post 410-2 to put the post 410-2 in focus. FIG. 4F shows the post 410-2 in focus, as indicated by the focus ring 432 displayed around the post 410-2. The post 410-2 is a post that includes a photo album that includes one or more photos uploaded by the post author to the social network server system 108. When the user selects the "see related" link 430-2, a related content listing 444 is displayed, as shown in FIG. 4G. The related content listing 444 includes identifiers (e.g., album names) of photo albums of photos posted by the post author. As with the related content listing 434 described above, the user may select arrow 436-1 or 436-2 to scroll through the related content listing 444.

Figure 4H:
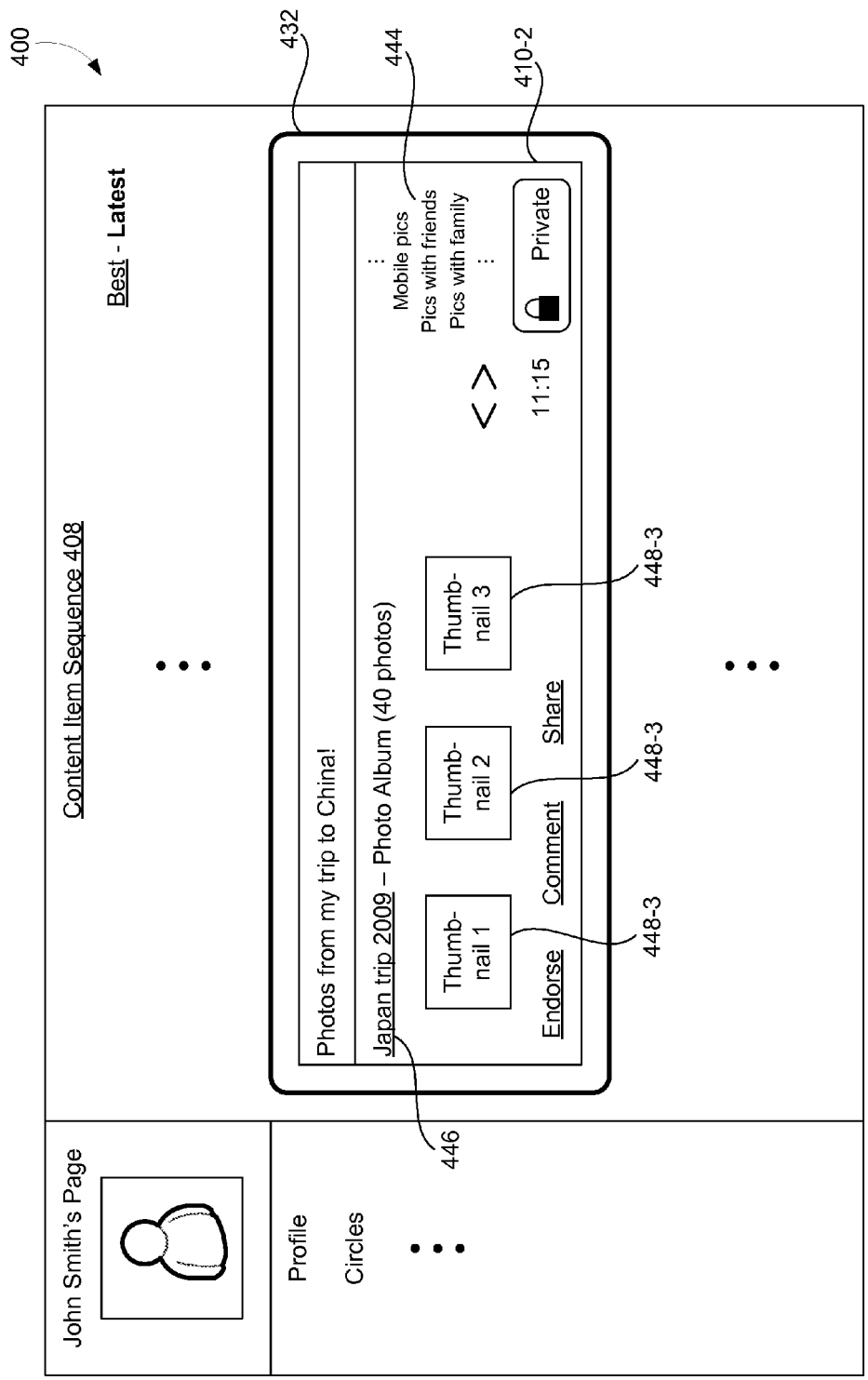

As the user scrolls through the listing 444, links and previews for the related photo albums may be displayed within the post 410-2. For example, FIG. 4G shows a snapshot of a transition from link 424 and thumbnails 428 (moving out of view to the left) to the link 446 and thumbnails 448 (moving to the left into view), both in direction 442. When the transition is complete, the link 446 and thumbnails 448 are displayed, as shown in FIG. 4H. The user may select the link 446 to view the corresponding photo album or select a thumbnail 448 to view the photo corresponding to the selected thumbnail. The related content list 444 also scrolls to show the title or identifier of another related photo album.

As described above, content items in the posts 410 may include external web pages and photos and images (e.g., individual photos, photos in sets or albums) uploaded to the social network server system 108. In some embodiments, types of content that may be posted include textual messages (e.g., status updates), videos (from external content hosts 110), links to external web pages, which may be news articles or non-news web pages, and images (e.g., photos, digital pictures, etc.). In some embodiments, a criterion for determining whether a content item is related to another is whether they are of the same type. In some embodiments, what content is determined to be similar to a posted content item depends on the type of content item that is posted.

For example, if the posted content item is a photo or photo album, then a related content item is a photo or image from the same source as the posted content item (e.g., person, web site, etc.). For example, a content item related to a photo posted by the post author may be another photo posted by the same post author. If the posted content item is a textual message, then a related content item may be another textual message from the same source. If the posted content item is a video from an external host, then a related content item may be another video from the same author or source or another video that is similar to the posted video, where the similarity is determined based on title, keywords, tags, etc. of the videos. If the posted content item is a link (e.g., a Universal Resource Locator—"URL") to a news article, then a related content item may be a news article that is determined to be similar to the posted news article by, e.g., a search engine (e.g., search engine 112). More generally, if the posted content item is a link (e.g., URL) to a web page, a content item that is related to the posted link to the web page may be a link to another webpage from the same web site as the web page linked to by the posted link, a web page with similar content as the web page linked to by the posted link, or a web page that is endorsed or commented on by the same subscribers or contacts as the web page linked to by the posted link. In some embodiments, the similarity criteria described above may be components of a similarity score determination for a content item; a content item is determined to be related to a posted content item of the same type if the similarity of the content item exceeds a predefined threshold.

In some embodiments, a similarity score is determined for a content item with respect to a posted content item in order to ascertain whether the content items are related. Criteria that may be used for the similarity score determination include subject matter, the source, keywords, and who endorsed, commented on, and/or shared the content items. Content items (of the same type) whose similarity scores are above a predefined threshold are considered to be related to the posted content item.

Figure 4I:
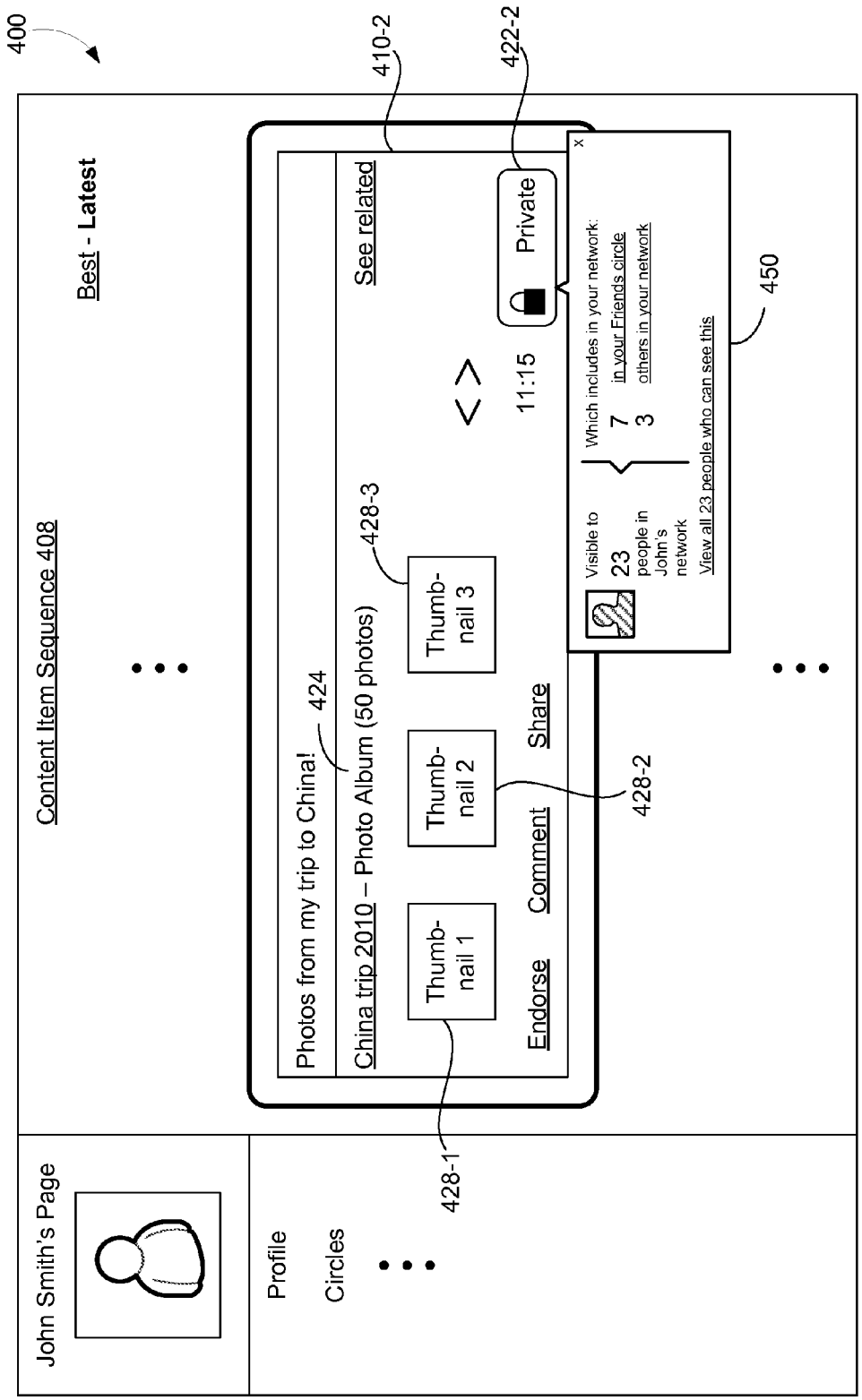

FIG. 4I illustrates a visibility inspector window 450 for the post 410-2 in the content item sequence 408. A user viewing the content item sequence 408 in the social network page 400 may select the visibility status indicator 422-2 of the posting 410-2 to bring up the visibility inspector window 450 for the post 410-2, and similarly with visibility status indicator 422-1 for post 410-1. The visibility inspector window 450 shows who, within the network of the author of the post 410-2, can view the post 410-2, and who among those are also in the network of a user viewing the post 410-2 in the content item sequence 408. Examples of visibility inspector windows are described in U.S. Provisional Patent Application No. 61/408, 732, entitled "Social Circles in Social Networks," filed Nov. 1, 2010, which is incorporated by reference above.

Figure 5A:
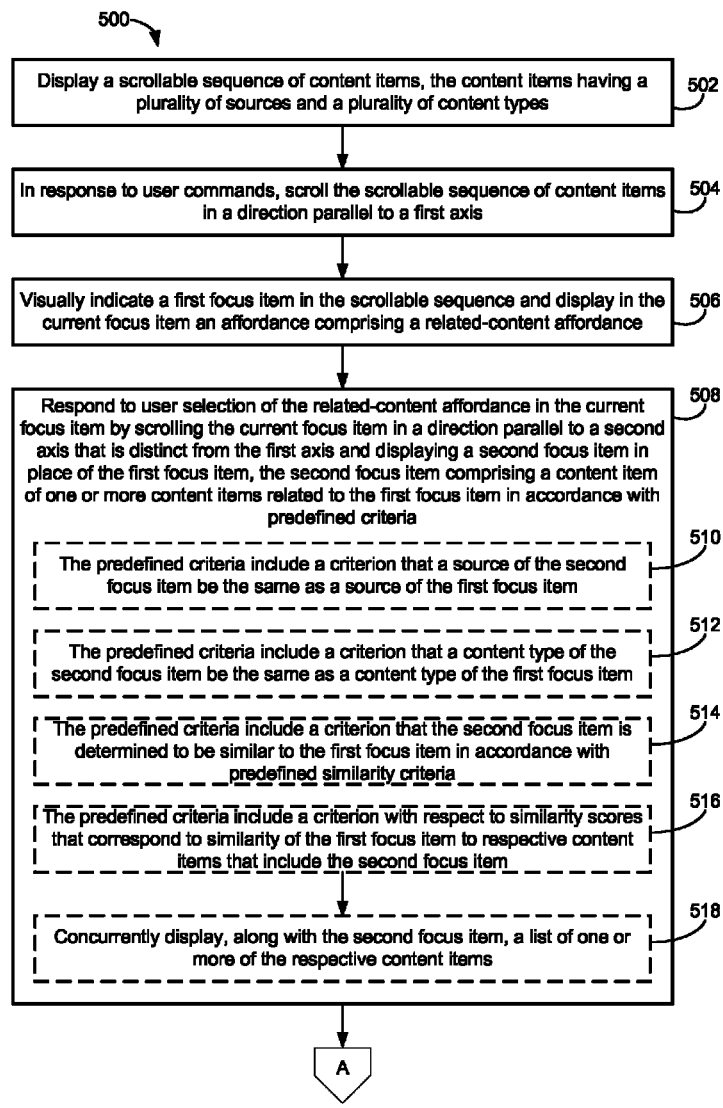
FIGS. 5A-5B illustrate flow diagrams of a process for displaying related content in a content stream, in accordance with some embodiments.
Figure 5B:
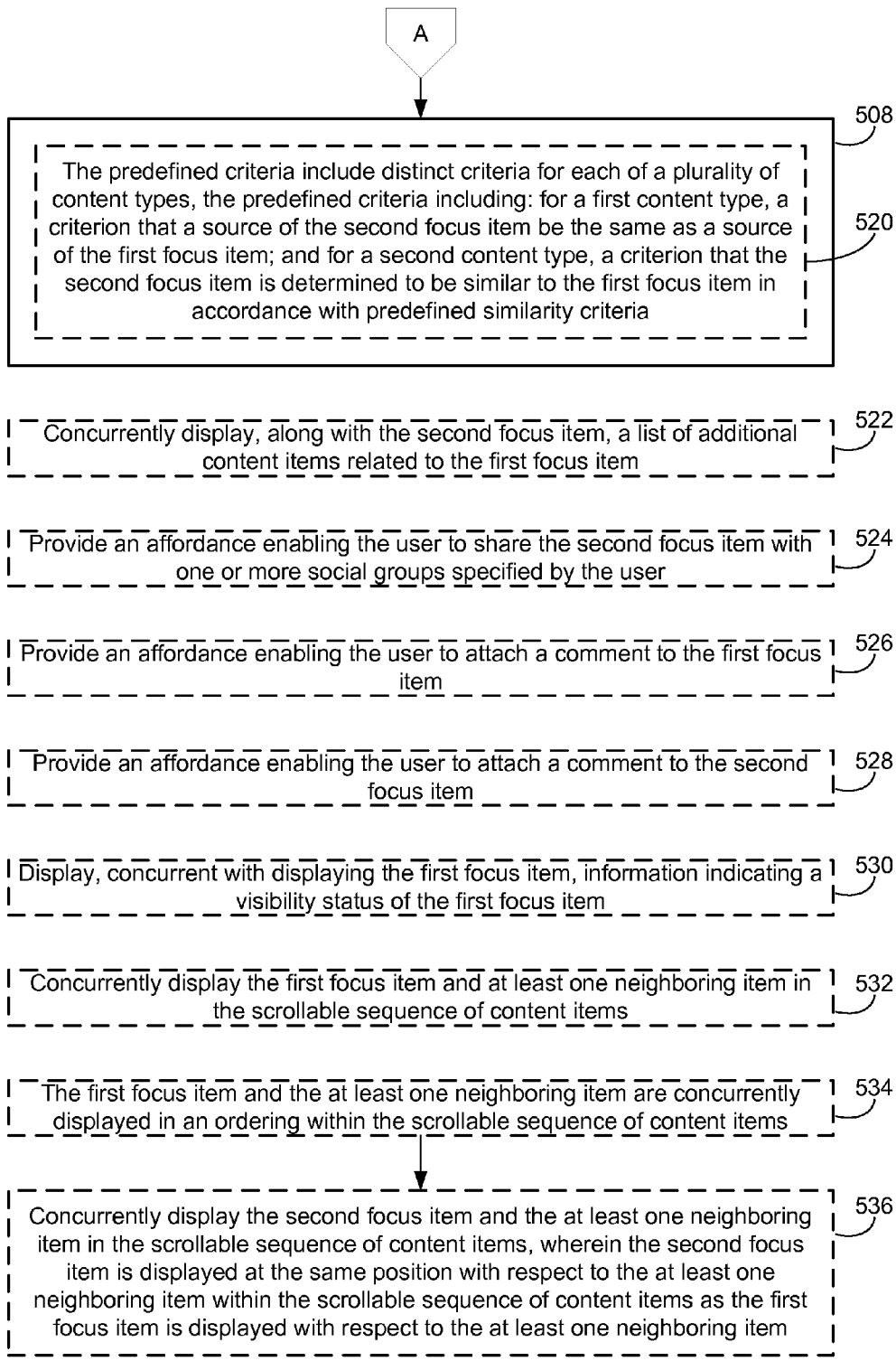

FIGS. 5A-5B illustrate a flow diagram of a process 500 for displaying related content in a content stream, in accordance with some embodiments. Each of the operations shown in FIGS. 5A-5B corresponds to instructions stored in a computer memory or non-transitory computer readable storage medium of a client system. Process 500 is performed by a client system (e.g., client system 104). Typically, however, the identification of related content items, and the identification of the content items to include in the scrollable sequence of content items are made by a server system remote from the client system, and the identified content items are provided by the server system to the client system for scrolling and display.

The client system displays a scrollable sequence of content items, where the content items have a plurality of sources and a plurality of content types (502). Content items posted by a subscriber of a social network service may be displayed as a content item sequence (e.g., content item sequence 408, FIG. 4A). The content item sequence may include content items of multiple types and multiple sources (e.g., post 410-1 with a link 412 to an article at a content host 110 and post 410-2 with a photo album 424 of photos uploaded by the post author to the social network server system 108).

In response to user commands, the client system scrolls the scrollable sequence of content items in a direction parallel to a first axis (504). For example, the content item sequence 408 is scrollable by the user along (i.e., parallel to) the axis 409.

The client system visually indicates a first focus item in the scrollable sequence and displays in the current focus item an affordance comprising a related-content affordance (506). A focus ring 432 is displayed around a post 410-1 in the content item sequence 408, to visually indicate that the post 410-1 (and by extension the link 412) is in focus, as shown in FIG. 4B. Also, a "see related" link 430-1 is displayed in the post 410-1. In some embodiments, the "see related" link 430-1 is a related-content affordance that a user may select.

The client system responds to user selection of the related-content affordance in the current focus item by scrolling the current focus item in a direction parallel to a second axis that is distinct from the first axis and displaying a second focus item in place of the first focus item, the second focus item including a content item of one or more content items related to the first focus item in accordance with predefined criteria (508). In response to user selection of the "see related" link 430-1, the link 412 to the originally posted article and the corresponding preview 414 is scrolled out of view along direction 442, which is parallel to an axis that is different from the axis of direction 409. In place of the link 412 and preview 414, a link 438 and the corresponding preview 440 are scrolled into view along direction 442 and displayed, as shown in FIGS. 4D-4E. The link 438 links to an article that is related to the article linked by the link 412. The article linked by the link 438 is one of one or more related articles determined (typically by a server system, such as social network server system 108) in accordance with predefined criteria.

As another example, in response to user selection of "see related" link 430-2 in post 410-2 (FIG. 4F), link 424 to the originally posted photo album and the corresponding thumbnails 428 are scrolled out of view in direction 442 (FIG. 4G). In place of the link 424 and preview 428, a link 446 and the corresponding thumbnails 448 are scrolled into view along direction 442 and displayed, as shown in FIGS. 4G-4H. The link 446 links to an album with photos related to the photos in the album linked to by link 424. The album linked by the link 446 is one of one or more albums with related photos determined in accordance with predefined criteria.

In some embodiments, the predefined criteria include a criterion that a source of the second focus item be the same as a source of the first focus item (510). For example, if the originally posted content item are one or more photos (e.g., organized into a photo album) uploaded by a user (e.g., the post author who originally posted the photos) to the social network server system 108, the related content item are one or more photos from the same user.

In some embodiments, the predefined criteria include a criterion that a content type of the second focus item be the same as a content type of the first focus item (512). For example, if the originally posted content item are photos (e.g., in a photo album), the related content items are also photos. As another example, if the originally posted content item is an online video clip, the related content items are also online video clips.

In some embodiments, the predefined criteria include a criterion that the second focus item is determined to be similar to the first focus item in accordance with predefined similarity criteria (514). For example, if the originally posted content item is a video, a related content item may be a video that is determined to be similar based on both videos having the same tags (keywords or tags in common being a predefined similarity criterion). As another example, if the originally posted content item is a web page, a related content item may be a web page that has keywords in common with the originally posted web page. Alternatively, the related content item may be a web page having a profile (e.g., a set of categories or clusters, and associated weights for the categories or clusters) that is similar to the profile of the originally posted web page, where similarity is determined by computing a dot product (or a similar function) of the profiles of the two web pages.

In some embodiments, the predefined criteria include a criterion with respect to similarity scores that correspond to similarity of the first focus item to respective content items that include the second focus item (516). For example, for a posted link to a web page, similarity scores are determined for one or more other content items. Those content items whose similarity score exceeds a predefined threshold are determined to be related to the posted content item and thus may be viewed when the user selects the related-content affordance.

In some embodiments, the client system concurrently displays, along with the second focus item, a list of one or more of the respective content items (518). For example, while the second focus item (e.g., link 438 and preview 440, FIG. 4E) is displayed, a list of content items related to the first focus item (e.g., listing 434) is displayed concurrently. The list of related content items may be determined based similarity scores with respect to the first focus item (the originally posted content item).

In some embodiments, the predefined criteria include distinct criteria for each of a plurality of content types, with the predefined criteria including, for a first content type, a criterion that a source of the second focus item be the same as a source of the first focus item; and for a second content type, a criterion that the second focus item is determined to be similar to the first focus item in accordance with predefined similarity criteria (520). The posted content items may be of different types, and there may be different criteria regarding related content for the respective types. For some types, a criterion is a common source. For example, for photos or textual messages, another photo or textual message is related to a posted photo or textual message, respectively, if the source (e.g., same author, same uploader) is the same. For some other types, the criterion for relatedness is a determination of similarity in accordance with predefined criteria (e.g., common tags or keywords, similar profiles, etc.). The determination of similarity may be embodied in a similarity score determined in accordance with the same predefined criteria.

In some embodiments, the client system concurrently displays, along with the second focus item, a list of additional content items related to the first focus item (522). For example, while the second focus item (e.g., link 438 and preview 440, FIG. 4E) is displayed, the list of content items related to the first focus item (e.g., listing 434) is displayed concurrently.

In some embodiments, the client system provides an affordance enabling the user to share the second focus item with one or more social groups specified by the user (524). While the second focus item (e.g., link 438 and preview 440) is being displayed, an affordance enabling a user to share the second focus item (e.g., "share" link 420-1) may be displayed concurrently (FIG. 4E). The user may select the "share" link 420-1 to share the second focus item (e.g., link 438 and preview 440) with one or more groups (e.g., circles) in the social network.

In some embodiments, the client system provides an affordance enabling the user to attach a comment to the first focus item (526). While the first focus item (e.g., link 412 and preview 414) is being displayed, an affordance enabling a user to comment on the first focus item (e.g., "comment" link 418-1) may be displayed concurrently (FIG. 4B). The user may select the "comment" link 418-1 to comment on the first focus item (e.g., link 412 and preview 414), with the comment being attached to the first focus item (e.g., as a comment to the post 410-1 containing the link 412 and preview 414).

In some embodiments, the client system provides an affordance enabling the user to attach a comment to the second focus item (528). While the second focus item (e.g., link 438 and preview 440) is displayed, an affordance enabling a user to comment on the second focus item (e.g., "comment" link 418-1) may be displayed concurrently (FIG. 4E). The user may select the "comment" link 418-1 to comment on the second focus item (e.g., link 438 and preview 440), with the comment being attached to the second focus item (e.g., as a comment to the post 410-1 and including the link 438 in the comment).

In some embodiments, the client system displays, concurrently with displaying the first focus item, information indicating a visibility status of the first focus item (530). While the first focus item (e.g., link 424 and thumbnails 428) is being displayed, a visibility status window 450 may be displayed concurrently with the first focus item when the user selects the visibility status indicator 422-2 (FIG. 4I). The visibility status indicator 450 shows who in the post author's network may see the first focus item.

In some embodiments, the client system concurrently displays the first focus item and at least one neighboring item in the scrollable sequence of content items (532). In a content item sequence (e.g., content item sequence 408), the first focus item (e.g., link 412 in post 410-1) is displayed concurrently with other posts above and/or below (e.g., post 410-2) the first focus item (FIG. 4B).

In some embodiments, the first focus item and the at least one neighboring item are concurrently displayed in an ordering within the scrollable sequence of content items (534), and the client system concurrently displays the second focus item and the at least one neighboring item in the scrollable sequence of content items, where the second focus item is displayed at the same position with respect to the at least one neighboring item within the scrollable sequence of content items as the first focus item is displayed with respect to the at least one neighboring item (536). In a content item sequence (e.g., content item sequence 408), the posts 410, including the first focus item (e.g., link 412 in post 410-1, FIG. 4B) and the posts above and/or below (e.g., post 410-2) the first focus item, may be ordered chronologically or by quality (e.g., in response to user selection of a "latest" selector 431 or a "best" selector 433, respectively) (FIG. 4B). When the (related content) second focus item (e.g., link 438 in post 410-1, FIG. 4E) is displayed, it is displayed in the same position with respect to the other posts (e.g., post 410-2) in the content item sequence as the first focus item was displayed with respect to those other posts. Thus, for example, the post 410-1 is displayed at the same position in the content item sequence 408 with respect to the post 410-2, whether link 412 or link 438 is displayed in the post 410-1.

For situations in which the systems discussed above collect information about users, the users may be provided with an opportunity to opt in/out of programs or features that may collect personal information (e.g., information about a user's preferences or a user's contributions to social content providers). In addition, in some examples, certain data may be anonymized in one or more ways before it is stored or used, so that personally identifiable information is removed. For example, a user's identity may be anonymized so that the personally identifiable information cannot be determined or associated for the user and so that identified user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that a number of the logical stages could be implemented in hardware, firmware, software or any suitable combination thereof.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings.

What is claimed is:

1. A method, performed by a system having one or more processors, a display, and memory storing one or more programs for execution by the one or more processors, comprising:
at the system:
displaying respective portions of a scrollable sequence of content items, the content items having a plurality of sources and a plurality of content types;
in response to user commands, scrolling the scrollable sequence of content items, including a first focus item and a plurality of other content items in the scrollable sequence, in a direction parallel to a first axis;
in response to a first user selection of the first focus item, while concurrently displaying the first focus item and the plurality of other content items in the scrollable sequence at distinct positions along the first axis, visually indicating the first focus item in the scrollable sequence, wherein the displayed first focus item includes an affordance comprising a related-content affordance;
responding to a second user selection of the related-content affordance by: displaying within the first focus item a related content listing and a scrolling affordance, the related content listing and the scrolling affordance replacing the related-content affordance, the related content listing including a list of information identifiers of respective content items associated with content of the first focus item; and
after receiving a third user selection of the scrolling affordance, responding to the third user selection by:
scrolling the first focus item in a direction parallel to a second axis that is distinct from the first axis;
displaying a second focus item in place of the first focus item, wherein the second focus item corresponds to an information identifier in the related content listing; and
continuing to display said plurality of other content items in the scrollable sequence at said distinct positions along the first axis while scrolling the first focus item in the direction parallel to the second axis and displaying the second focus item in place of the first focus item.

2. The method of claim 1, wherein the second focus item is selected in accordance with predefined criteria, and the predefined criteria include a criterion that a source of the second focus item be the same as a source of the first focus item.

3. The method of claim 1, wherein the second focus item is selected in accordance with predefined criteria, and the predefined criteria include a criterion that a content type of the second focus item be the same as a content type of the first focus item.

4. The method of claim 1, wherein the second focus item is selected in accordance with predefined criteria, and the predefined criteria include a criterion that the second focus item is determined to be similar to the first focus item in accordance with predefined similarity criteria.

5. The method of claim 1, wherein the second focus item is selected in accordance with predefined criteria, and the predefined criteria include a criterion with respect to similarity scores that correspond to similarity of the first focus item to respective content items that include the second focus item.

6. The method of claim 5, further comprising:
concurrently displaying, along with the second focus item, a list of one or more of the respective content items.

7. The method of claim 1, wherein the second focus item is selected in accordance with predefined criteria, and the predefined criteria include distinct criteria for each of a plurality of content types, the predefined criteria including:
for a first content type, a criterion that a source of the second focus item be the same as a source of the first focus item; and
for a second content type, a criterion that the second focus item is determined to be similar to the first focus item in accordance with predefined similarity criteria.

8. The method of claim 1, further comprising:
concurrently displaying, along with the second focus item, a list of additional content items related to the first focus item.

9. The method of claim 1, further comprising:
providing an affordance enabling the user to share the second focus item with one or more social groups specified by the user.

10. The method of claim 1, further comprising:
providing an affordance enabling the user to attach a comment to the first focus item.

11. The method of claim 1, further comprising:
providing an affordance enabling the user to attach a comment to the second focus item.

12. The method of claim 1, further comprising:
displaying, concurrently with displaying the first focus item, information indicating a visibility status of the first focus item.

13. The method of claim 1, further comprising:
concurrently displaying the first focus item and at least one neighboring item in the scrollable sequence of content items.

14. The method of claim 13, wherein the first focus item and the at least one neighboring item are concurrently displayed in an ordering within the scrollable sequence of content items, the method further comprising:
concurrently displaying the second focus item and the at least one neighboring item in the scrollable sequence of content items, wherein the second focus item is displayed at the same position with respect to the at least one neighboring item within the scrollable sequence of content items as the first focus item is displayed with respect to the at least one neighboring item.

15. The method of claim 1, wherein the respective portions of the scrollable sequence of content items are concurrently displayed in accordance with a first ordering at a plurality of distinct positions along the direction parallel to the first axis, and the first and second focus items are scrolled in the direction parallel to the second axis, in accordance with a second ordering of content items, wherein the second ordering is distinct from the first ordering, and wherein the first and second focus items are scrolled in the direction parallel to the second axis while concurrently continuing to display said other items in the scrollable sequence at other positions along the first axis.

16. A system, comprising:
one or more processors;
memory; and
one or more programs, wherein the one or more programs are stored in the memory and configured to be executed by the one or more processors, the one or more programs including instructions for:

displaying respective portions of a scrollable sequence of content items, the content items having a plurality of sources and a plurality of content types;

in response to user commands, scrolling the scrollable sequence of content items, including a first focus item and a plurality of other content items in the scrollable sequence, in a direction parallel to a first axis;

in response to a first user selection of the first focus item, while concurrently displaying the first focus item and the plurality of other content items in the scrollable sequence at distinct positions along the first axis, visually indicating the first focus item in the scrollable sequence, wherein the displayed first focus item includes an affordance comprising a related-content affordance;

responding to a second user selection of the related-content affordance by: displaying within the first focus item a related content listing and a scrolling affordance, the related content listing and the scrolling affordance replacing the related-content affordance, the related content listing including a list of information identifiers of respective content items associated with content of the first focus item; and after receiving a third user selection of the scrolling affordance, responding to the third user selection by:
scrolling the first focus item in a direction parallel to a second axis that is distinct from the first axis;
displaying a second focus item in place of the first focus item, wherein the second focus item corresponds to an information identifier in the related content listing; and
continuing to display said plurality of other content items in the scrollable sequence at said distinct positions along the first axis while scrolling the first focus item in the direction parallel to the second axis and displaying the second focus item in place of the first focus item.

17. The system of claim 16, wherein the second focus item is selected in accordance with predefined criteria, and the predefined criteria include a criterion that a source of the second focus item be the same as a source of the first focus item.

18. The system of claim 16, wherein the second focus item is selected in accordance with predefined criteria, and the predefined criteria include a criterion that a content type of the second focus item be the same as a content type of the first focus item.

19. The system of claim 16, wherein the second focus item is selected in accordance with predefined criteria, and the predefined criteria include a criterion that the second focus item is determined to be similar to the first focus item in accordance with predefined similarity criteria.

20. The system of claim 16, wherein the second focus item is selected in accordance with predefined criteria, and the predefined criteria include distinct criteria for each of a plurality of content types, the predefined criteria including:
for a first content type, a criterion that a source of the second focus item be the same as a source of the first focus item; and
for a second content type, a criterion that the second focus item is determined to be similar to the first focus item in accordance with predefined similarity criteria.

21. The system of claim 16, wherein the one or more programs further comprise instructions, which when executed by the one or more processors, cause the system to concurrently display respective portions of the scrollable sequence of content items in accordance with a first ordering at a plurality of distinct positions along the direction parallel to the first axis, and to scroll the first and second focus items in the direction parallel to the second axis, in accordance with a second ordering of content items, wherein the second ordering is distinct from the first ordering, and wherein the first and second focus items are scrolled in the direction parallel to the second axis while concurrently continuing to display said other items in the scrollable sequence at other positions along the first axis.

22. A non-transitory computer readable storage medium storing one or more programs, the one or more programs comprising instructions, which when executed by a system having one or more processors, cause the system to:
display respective portions of a scrollable sequence of content items, the content items having a plurality of sources and a plurality of content types;

in response to user commands, scroll the scrollable sequence of content items, including a first focus item and a plurality of other content items in the scrollable sequence, in a direction parallel to a first axis;

in response to a first user selection of the first focus item, while concurrently displaying the first focus item and the plurality of other content items in the scrollable sequence at distinct positions along the first axis, visually indicating the first focus item in the scrollable sequence, wherein the displayed first focus item includes an affordance comprising a related-content affordance;

responding to a second user selection of the related-content affordance by: displaying within the first focus item a related content listing and a scrolling affordance, the related content listing and the scrolling affordance replacing the related-content affordance, the related content listing including a list of information identifiers of respective content items associated with content of the first focus item; and after receiving a third user selection of the scrolling affordance, responding to the third user selection by:
scrolling the first focus item in a direction parallel to a second axis that is distinct from the first axis;
displaying a second focus item in place of the first focus item, wherein the second focus item corresponds to an information identifier in the related content listing; and
continuing to display said plurality of other content items in the scrollable sequence at said distinct positions along the first axis while scrolling the first focus item in the direction parallel to the second axis and displaying the second focus item in place of the first focus item.

23. The non-transitory computer readable storage medium of claim 22, wherein the second focus item is selected in accordance with predefined criteria, and the predefined criteria include a criterion that a source of the second focus item be the same as a source of the first focus item.

24. The non-transitory computer readable storage medium of claim 22, wherein the second focus item is selected in accordance with predefined criteria, and the predefined criteria include a criterion that a content type of the second focus item be the same as a content type of the first focus item.

25. The non-transitory computer readable storage medium of claim 22, wherein the second focus item is selected in accordance with predefined criteria, and the predefined criteria include a criterion that the second focus item is determined to be similar to the first focus item in accordance with predefined similarity criteria.

26. The non-transitory computer readable storage medium of claim 22, wherein the second focus item is selected in accordance with predefined criteria, and the predefined criteria include distinct criteria for each of a plurality of content types, the predefined criteria including:
- for a first content type, a criterion that a source of the second focus item be the same as a source of the first focus item; and
- for a second content type, a criterion that the second focus item is determined to be similar to the first focus item in accordance with predefined similarity criteria.

27. The non-transitory computer readable storage medium of claim 22, wherein the one or more programs further comprise instructions, which when executed by the system having one or more processors, cause the system to concurrently display respective portions of the scrollable sequence of content items in accordance with a first ordering at a plurality of distinct positions along the direction parallel to the first axis, and to scroll the first and second focus items in the direction parallel to the second axis, in accordance with a second ordering of content items, wherein the second ordering is distinct from the first ordering, and wherein the first and second focus items are scrolled in the direction parallel to the second axis while concurrently continuing to display said other items in the scrollable sequence at other positions along the first axis.

\* \* \* \* \*